United States Patent

[11] 3,578,270

[72] Inventor Stafford Malcolm Ellis
Gravesend, England
[21] Appl. No. 869,552
[22] Filed Oct. 27, 1969
[45] Patented May 11, 1971
[73] Assignee Elliott Brothers (London) Limited
London, England
[32] Priority Oct. 25, 1968
[33] Great Britain
[31] 50,650/68

[54] AIRCRAFT MANUAL CONTROL MEMBERS
9 Claims, 7 Drawing Figs.
[52] U.S. Cl. ............................................. 244/83,
244/77
[51] Int. Cl. ..................................................... B64c 13/04
[50] Field of Search ................................... 244/83, 90,
77 (OV), 77 (SE); 74/491

[56] References Cited
UNITED STATES PATENTS
3,017,142 1/1962 Rossire ....................... 244/83(X)
3,156,438 11/1964 Diller et al. .................. 244/83
3,472,086 10/1969 Iwasaki et al. ................ 244/83(X)

Primary Examiner—Milton Buchler
Assistant Examiner—Carl A. Rutledge
Attorney—Kirschstein, Kirschstein, Ottinger and Frank ABSTRACT: A pilots manual control member for an aircraft is adapted to engage control runs of the aircraft so that, with the autopilot disengaged, pilot pitch and roll demands applied to the control member are transmitted by the control runs, either directly or by way of power amplification devices, to aircraft pitch and roll control surfaces. When the autopilot is engaged those control surfaces are normally automatically controlled via the control runs.

The control member is adapted so that, with the autopilot engaged, limited control of pitch and roll may be effected by the pilot by movement of the control member. Under these conditions the control member supplies electric demand signals to the autopilot.

Patented May 11, 1971

INVENTOR
STAFFORD M. ELLIS

BY Kirchstein, Kirchstein, Ottinger & Frank
ATTORNEYS

Patented May 11, 1971

INVENTOR
STAFFORD M. ELLIS

BY Kirschstein, Kirschstein, Ottinger & Frank
ATTORNEYS

AIRCRAFT MANUAL CONTROL MEMBERS

This invention relates to a pilot's manual control member for an aircraft fitted with an autopilot.

Such control members are commonly adapted to engage control runs of the aircraft so that, with the autopilot disengaged the pilot pitch and roll demands applied to the control member are transmitted by the control runs, either directly or by way of power amplification devices, to aircraft pitch and roll control surfaces, and which, when the autopilot is engaged, is moved by the control runs so as to follow movements of the control surfaces.

The selection of a desired autopilot mode is made by manual operation of a mode selector switch.

The mode selector switch enables the pilot to condition the autopilot so that the aircraft, typically, may acquire a desired altitude, attitude, or heading.

With the switch in, say, a heading select mode the autopilot is operative to control the aircraft so as to null any heading error signal developed at a pickoff associated with an aircraft compass. To change the course of the aircraft, whilst the autopilot is engaged in the heading select mode, the new heading is dialled on the compass and the pickoff develops a corresponding signal which the autopilot recognizes as an error signal and proceeds to null.

At the present time it is thought that with the autopilot controlling in accordance with a given flight parameter it might be preferable to introduce small corrections into the parameter by way of the control member from which, with the autopilot disengaged, the aircraft is manually controlled. With the autopilot engaged and the mode selector switch appropriately set, small corrections to the flight parameter are then made by pressure on the manual control member. In accordance with the pressure exerted an 'error' signal of greater or lesser magnitude, developed by sensing arrangements associated with the control member, is supplied to the autopilot.

According to one aspect of the invention a pilot's manual control member, for an aircraft fitted with an autopilot, comprises:

a first part having a cylindrical projection;

a second part having a cylindrical projection;

between the cylindrical projections, first and second axially spaced sets of bearings which support the second part coaxially of the first part and which permit a limited manual movement of the second part with respect to the first both in the axial direction and in rotation about the axis;

first and second spring biassing arrangements which respectively oppose axial and rotational movements of the second part with respect to the first;

first and second sensing arrangements for producing output signals representative of movements of the second part with respect to the first, in the direction of and in rotation about the axis, respectively; and with the control member fitted in an aircraft:

in manual flight control of the aircraft, manual movement of the two parts in the axial direction is for the purpose of controlling the aircraft in pitch; and manual movement of the second part in rotation about the axis, is for the purpose of controlling the aircraft in roll; and with the autopilot engaged, that is with the control member disabled from manual control of the aircraft, the limited manual movement of the second part with respect to the first is yet permitted, the signals developed by the sensing arrangements, in response to such movement, corresponding to pitch and roll demands, respectively, being supplied to the autopilot.

The axially spaced sets of bearings may each comprise a plurality of ball bearings respectively located in pairs of circumferentially spaced opposed recesses which are formed in the cylindrical projections and which are so dimensioned as to permit the said limited manual movement of the second part with respect to the first.

The cylindrical projection of the second part may be a hollow cylindrical projection which surrounds the cylindrical projection of the first part.

The spring biassing arrangements may be located between the cylindrical projections of the two parts.

At least one of the spring biassing arrangements is preloaded so as to present a force/deflection threshold to be overcome in moving the second part relative to the first.

The first spring biassing arrangement may comprise a first plurality of spring elements located between respective ones of a first plurality of pairs of opposed abutment surfaces of the first part and respective ones of a first plurality of pairs of opposed abutment surfaces of the second part; and the second spring biassing arrangement may comprise a second plurality of spring elements located between respective ones of a second plurality of pairs of opposed abutment surfaces of the first part and respective ones of a plurality of pairs of abutment surfaces of the second part;

at least one of the first plurality of spring elements is compressed, in the axial direction, between a pair of abutment surfaces of both parts and any remaining spring element of the first plurality is compressed, in the axial direction, between opposed abutment surfaces of one of the parts and has a predetermined clearance with respect to opposed abutment surfaces of the other part; and at least one of the second plurality of spring elements is compressed in a direction perpendicular to the axial direction between a pair of abutment surfaces of both parts and any remaining spring element of the second plurality is compressed, in the said perpendicular direction, between opposed abutment surfaces of one of the parts and has a predetermined clearance with respect to the opposed abutment surfaces of the other part.

The walls of the recesses contacted by the ball bearings may be of tungsten or like hard material.

Of the walls of the recesses contacted by the ball bearings, at least one wall may be adjustable radially towards and away from the opposing walls so as to eliminate any lost motion which may exist radially of the cylindrical portions.

According to another aspect of the invention a manual control member of the type described comprises:

a first part movable in a certain direction so as to control the aircraft in pitch;

a second part carried by the first part and rotatable about an axis fixed in the first part;

a first plurality of spring elements located between respective ones of a first plurality of pairs of opposed abutment surfaces of the first part and respective ones of a first plurality of pairs of opposed abutment surfaces of the second part;

a second plurality of spring elements located between respective ones of a second plurality of pairs of opposed abutment surfaces of the first part and respective ones of a plurality of pairs of abutment surfaces of the second part; and first and second sensing arrangements for producing output signals representative of movement of the second part relative to the first part in the direction of and about the said rotational axis respectively; and the opposed abutment surfaces are so disposed and spaced that at least one of the first plurality of spring elements is compressed, in the axial direction, between a pair of abutment surfaces of both parts and any remaining spring element of the first plurality is compressed, in the axial direction, between opposed abutment surfaces of one of the parts and has a predetermined clearance with respect to opposed abutment surfaces of the other part; and at least one of the second plurality of spring elements is compressed in a direction perpendicular to the axial direction between a pair of abutment surfaces of both parts and any remaining spring element of the second plurality is compressed, in the said perpendicular direction, between opposed abutment surfaces of one of the parts and has a predetermined clearance with respect to the opposed abutment surfaces of the other part.

An embodiment of the invention is hereinafter described with reference to the accompanying drawings in which.

Figure 1:
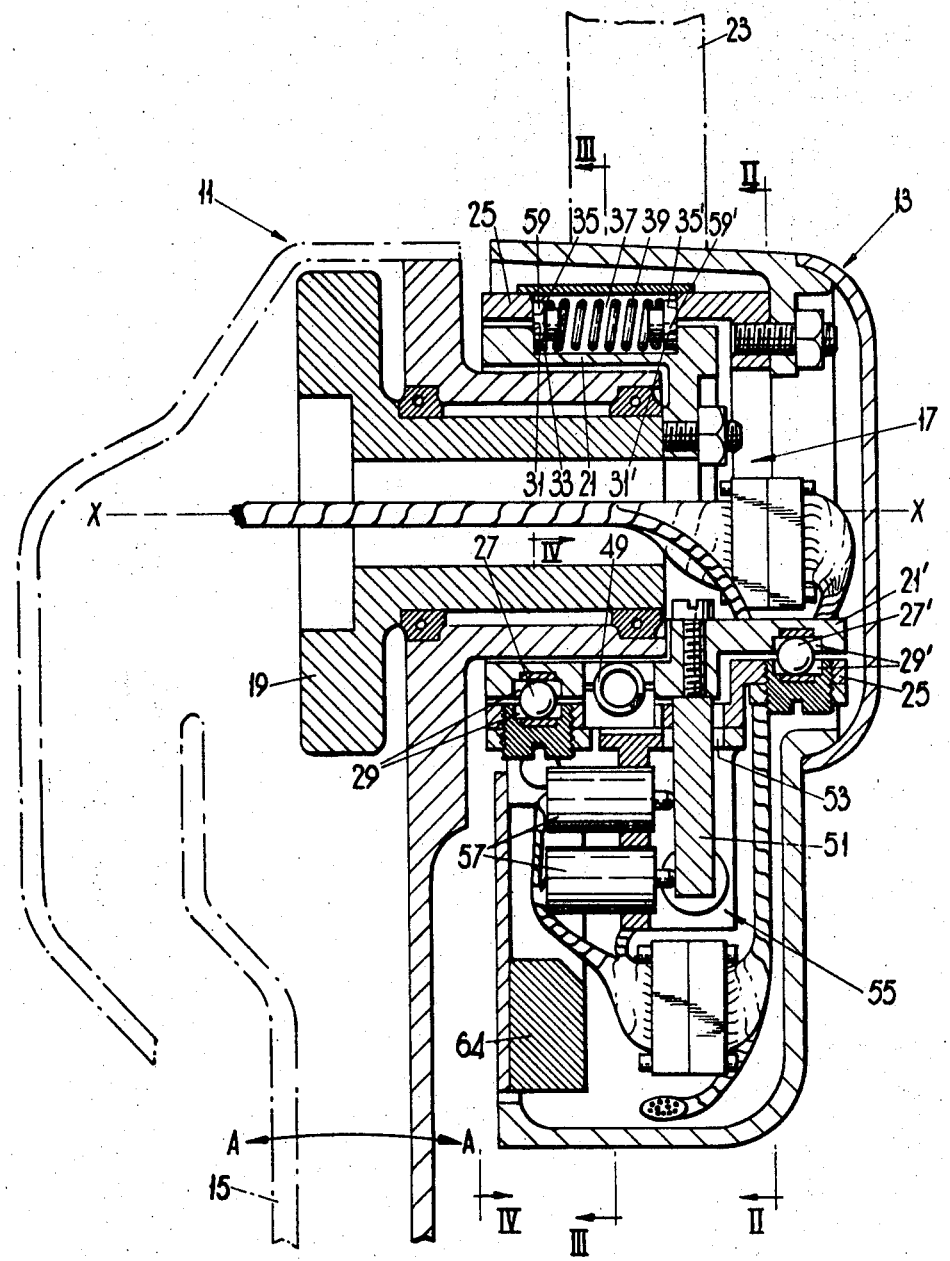
FIG. 1 shows a section through a manual control member taken on the line I–I of FIG. 2.

The manual control member, when in an aircraft fitted with an autopilot, engages control runs of the aircraft so that, with the autopilot disengaged, pilot demands applied to the control member are transmitted by the control runs, either directly or by way of power amplification devices, to aircraft control surfaces which control the aircraft in pitch and roll. When the autopilot is engaged, the control member is moved by the control runs to follow movements of the control surfaces. In this way, the position of the control member reflects, faithfully, the position of the control surfaces so that, in the event of an autopilot disconnect, the manual member is in position for immediate manual control by the pilot.

Since the precise nature of the autopilot, control runs, power amplification devices and mechanism by which movement is transmitted from the control member to the control runs and, conversely, from the control runs to the control member, is not relevant to the present invention no elaboration of these items is called for. U.K. Pat. No. 777,938 may be referred to for a general understanding of these matters.

The manual control member has a first part 11 movable in a certain direction A—A (FIG. 1) so as to control the aircraft in pitch; and a second part 13 carried by the first part 11 and rotatable about an axis X—X, fixed in the first part 11, so as to control the aircraft in roll.

The first part 11 has a column portion 15 and a pivot portion 17. The pivot portion, which defines the pivot axis X—X, comprises a cylindrical boss 19, integral with the column portion 15 and a generally cylindrical portion 21 bolted to the boss 19 coaxially with the boss.

The second part 13 comprises a 'horned' steering wheel portion 23 and a generally cylindrical portion 25 bolted to the steering wheel portion. The cylindrical portion 25 is supported coaxially with the cylindrical portion 21 by three circumferentially spaced ball bearings such as 27 and three circumferentially spaced ball bearings such as 27'. The balls 27 are located in opposed recesses 29 formed in the cylindrical portions 21 and 25 at one end of the cylindrical portions; the balls 27' are in opposed recesses 29' formed in lugs which extend from the cylindrical portions 21 and 25 produced, e.g., by machining operations.

The recesses 29, 29' are such that the cylindrical member 25, whilst being supported coaxially of the cylindrical portion 21, is able to move with respect to the latter portion, within certain limits, both in the direction of and in rotation about the axis X—X.

Located between respective ones 31, 31' of a first plurality of pairs of opposed abutment surfaces, constituted by the end walls of recesses 33 formed in the member 21 and, also, between respective ones 35, 35' of a first plurality of pairs of opposed abutment surfaces, constituted by the end walls of recesses 37 formed in the member 25, there are a first plurality of spring elements 39.

Located between respective ones 41, 41' of a second plurality of pairs of opposed abutment surfaces, constituted by the end walls of recesses 43 formed in the member 21 and, also, between respective ones 45, 45' of a second plurality of pairs of opposed abutment surfaces, constituted by the end walls of recesses 47 formed in the member 25, there are a second plurality of spring elements 49.

The first plurality of pairs of opposed abutment surfaces 31, 31' and 35, 35' are so disposed and spaced that each of the first plurality of spring elements 39 is compressed in the direction of the axis X—X between abutment surfaces of both of the cylindrical members 21, 25. Similarly, the second plurality of pairs of opposed abutment surfaces 41, 41' and 45, 45' are so disposed and spaced that each of the second plurality of spring elements 49 is compressed in a direction perpendicular to the axis X—X between abutment surfaces of both of the members 21, 25.

A member 51 of rectangular cross section is bolted to the member 21 and projects through an aperture 53 in the member 25. The member 51 constitutes one part of first and second sensing arrangements 55, 55'. The other part of the sensing arrangement 55 comprises transducer devices 57 fixed to the member 25. The other part of the sensing arrangement 55' comprises transducer devices 57' also fixed to the member 25.

The transducer devices 57, 57' may, conveniently, be standard linear variable differential transformers.

With the autopilot engaged, force applied to the cylindrical portion 25, in the direction of the axis X—X or about that axis, as a result of pressure applied to the steering wheel portion 23, is ineffective in producing movement of the portion 25 relative to the portion 21 unless the force is in excess of a certain value set by the compression of the spring elements 39 or, as the case may be, the spring elements 49. When, however, this force threshold is passed, the member 25 moves and, in moving, moves the transducers 57, or 57' in one sense or the other relative to the member 51. As a result of such relative movement between the transducer devices 57 or 57' and the member 51, a signal is developed by the transducer devices which is employed to control the appropriate control surfaces not by way of the control runs from the manual control member but by way of the autopilot.

Figure 2:
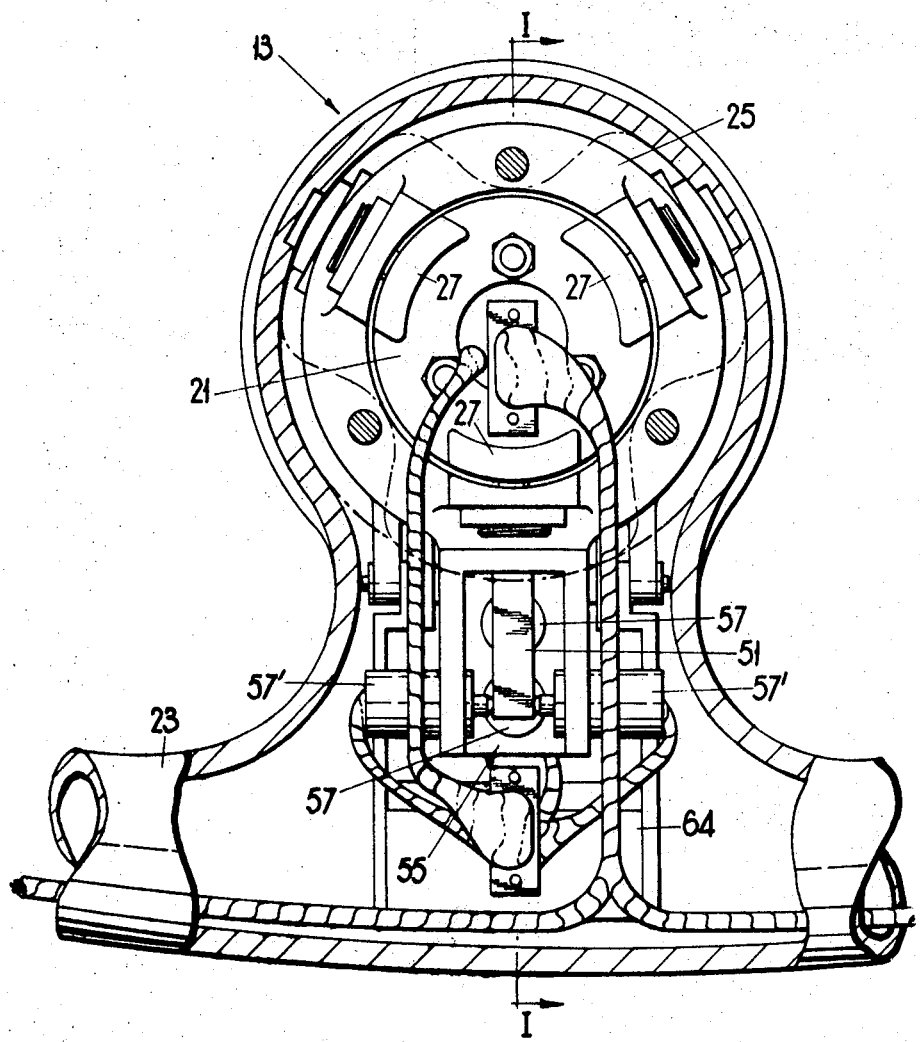
FIG. 2 shows a section taken on the line II–II of FIG. 1.
Figure 3:
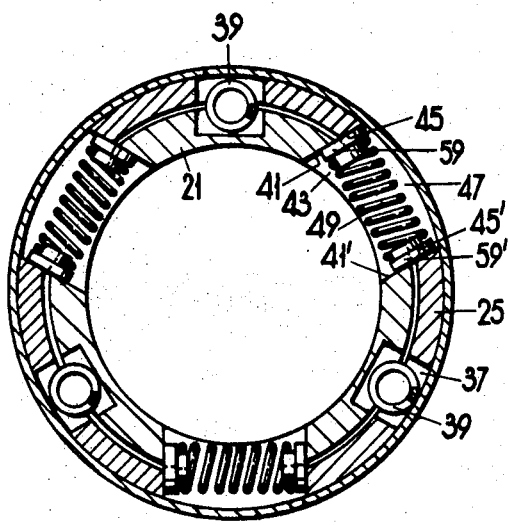
FIG. 3 shows a part of a section taken on the III—III of FIG. 1.
Figure 4:
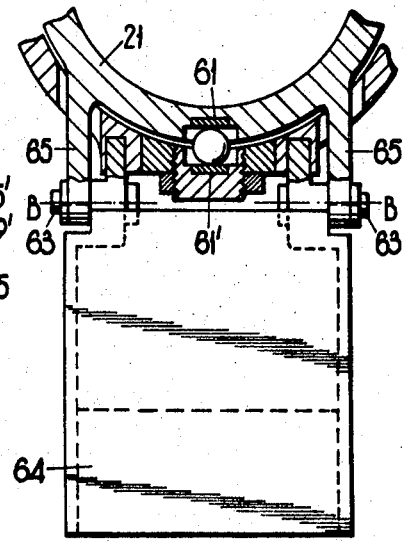
FIG. 4 shows a part of a section taken on the line IV—IV of FIG. 1.
Figure 5:
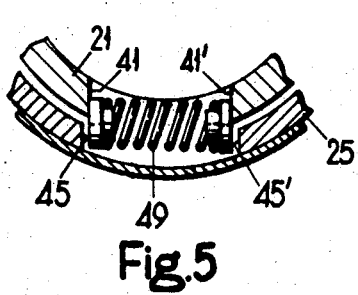
FIG. 5 is a scrap view showing a detail of an alternative arrangement of part of the control member.
Figure 6:
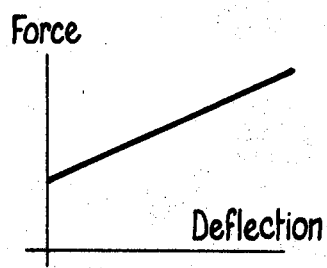
FIG. 6 is a graph showing a force/deflection spring characteristic achieved with the manual control member of FIGS. 1 and 2.
Figure 7:
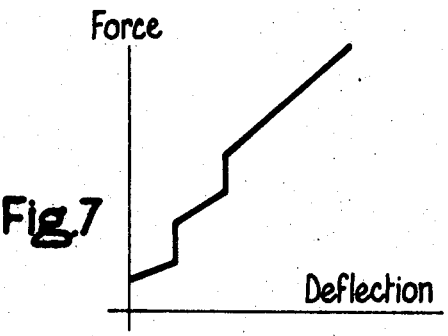
FIG. 7 is a graph showing a force/deflection spring characteristic achieved with a modified manual control member.

With each of the first (or second) plurality of spring elements compressed, ab initio, a force/deflection characteristic, as shown in FIG. 7, is encountered. However, it may be desired to produce a force/deflection characteristic as shown in FIG. 7. To this end, the arrangement of the spring elements may be as shown in FIG. 5. Here one of the spring elements 49 is shown to be compressed between a pair of opposed abutment surfaces 41, 41' on one of the parts, conveniently the first part 21, only. The spring element 49, whilst being located between the surfaces 45, 45' of the other part 25, has a clearance with respect to the latter surfaces. It will be apparent that where there are, as shown in FIGS. 1 and 2, three such spring elements two of the spring elements might have a clearance such as that shown in FIG. 5. Moreover, the clearance in respect of one of the two spring elements might differ. The force/deflection of such a spring and abutment configuration is shown in FIG. 7.

To counter the effect of $g$ forces acting on the control member in the direction A—A, a pitch balance weight 64 is suspended on the portion 21, so as to be rotatable about a pivot axis B—B at right angles to the direction A—A, by pivot pins 63 which extend into apertures formed in downwardly extending arms 65.

As shown, the spring elements 39, 49 are between bearing pads 59, 59' which may be of P.T.F.E. located at the ends of the springs.

To reduce wear between the balls 27, 27' and the walls of the recesses the walls contacted by the balls may be constituted by tungsten pads 61, 61'.

I claim:

1. A pilot's manual control member for an aircraft fitted with an autopilot, which comprises:

a first part having a cylindrical projection;

a second part having a cylindrical projection;

between the cylindrical projections, first and second axially spaced sets of bearings which support the second part coaxially of the first part and which permit a limited manual movement of the second part with respect to the first both in the axial direction and in rotation about the axis;

first and second spring biassing arrangements which respectively oppose axial and rotational movements of the second part with respect to the first;

first and second sensing arrangements for producing output signals representative of movements of the second part with respect to the first, in the direction of and in rotation about the axis, respectively; and in which, with the control member fitted in an aircraft;

in manual flight control of the aircraft, manual movement of the two parts in the axial direction is for the purpose of controlling the aircraft in pitch; and manual movement of the second part in rotation about the axis, is for the purpose of controlling the aircraft in roll; and with the autopilot engaged, that is with the control member disabled from manual control of the aircraft, the limited manual movement of the second part with respect to the first is yet permitted, the signals developed by the sensing arrangements, in response to such movement, corresponding to pitch and roll demands, respectively, being supplied to the autopilot.

2. A control member according to claim 1 in which the axially spaced sets of bearings each comprise a plurality of ball bearings respectively located in pairs of circumferentially spaced opposed recesses which are formed in the cylindrical projections and which are so dimensioned as to permit the said limited manual movement of the second part with respect to the first.

3. A control member according to claim 2 in which the walls of the recesses contacted by the ball bearings are of tungsten or like hard material.

4. A control member according to claim 3 in which, of the walls of the recesses contacted by the ball bearings at least one wall is adjustable radially towards and away from the opposing wall so as to eliminate any lost motion which may exist radially of the cylindrical portions.

5. A control member according to claim 1 in which the cylindrical projection of the second part is a hollow cylindrical projection which surrounds the cylindrical projection of the first part.

6. A control member according to claim 1 in which the spring biassing arrangements are located between the cylindrical projections of the two parts.

7. A control member according to claim 6, in which:

the first spring biassing arrangement comprises a first plurality of spring elements located between respective ones of a first plurality of pairs of opposed abutment surfaces of the cylindrical projection of the first part and respective ones of a first plurality of pairs of opposed abutment surfaces of the cylindrical projection of the second part;

the second spring biassing arrangement comprises a second plurality of spring elements located between respective ones of a second plurality of pairs of opposed abutment surfaces of the cylindrical projection of the first part and respective ones of a plurality of pairs of abutment surfaces of the second part; and in which at least one of the first plurality of spring elements is compressed, in the axial direction, between a pair of abutment surfaces of both cylindrical projections and any remaining spring element of the first plurality is compressed, in the axial direction, between opposed abutment surfaces of one of the cylindrical projections and has a predetermined clearance with respect to opposed abutment surfaces of the other cylindrical projection; and at least one of the second plurality of spring elements is compressed in a direction perpendicular to the axial direction between a pair of abutment surfaces of both cylindrical projections and any remaining spring element of the second plurality is compressed, in the said perpendicular direction, between opposed abutment surfaces of one of the cylindrical projections and has a predetermined clearance with respect to the opposed abutment surfaces of the other cylindrical projection.

8. A control member according to claim 1 in which at least one of the spring biassing arrangements is preloaded so as to present a force/deflection threshold to be overcome in moving the second part relative to the first.

9. A pilot's manual control member for an aircraft fitted with an autopilot which comprises:

a first part movable in a certain direction so as to control the aircraft in pitch;

a second part carried by the first part and rotatable about an axis fixed in the first part;

a first plurality of spring elements located between respective ones of a first plurality of pairs of opposed abutment surfaces of the first part and respective ones of a first plurality of pairs of opposed abutment surfaces of the second part;

a second plurality of spring elements located between respective ones of a second plurality of pairs of opposed abutment surfaces of the first part and respective ones of a plurality of pairs of abutment surfaces of the second part;

first and second sensing arrangements for producing output signals representative of movement of the second part relative to the first part in the direction of and about the said rotational axis respectively; and the opposed abutment surfaces are so disposed and spaced that at least one of the first plurality of spring elements is compressed, in the axial direction, between a pair of abutment surfaces of both parts and any remaining spring element of the first plurality is compressed, in the axial direction, between opposed abutment surfaces of one of the parts and has a predetermined clearance with respect to opposed abutment surfaces of the other part; and at least one of the second plurality of spring elements is compressed in a direction perpendicular to the axial direction between a pair of abutment surfaces of both parts and any remaining spring element of the second plurality is compressed, in the said perpendicular direction, between opposed abutment surfaces of one of the parts and has a predetermined clearance with respect to the opposed abutment surfaces of the other part.